(No Model.) 2 Sheets—Sheet 2.

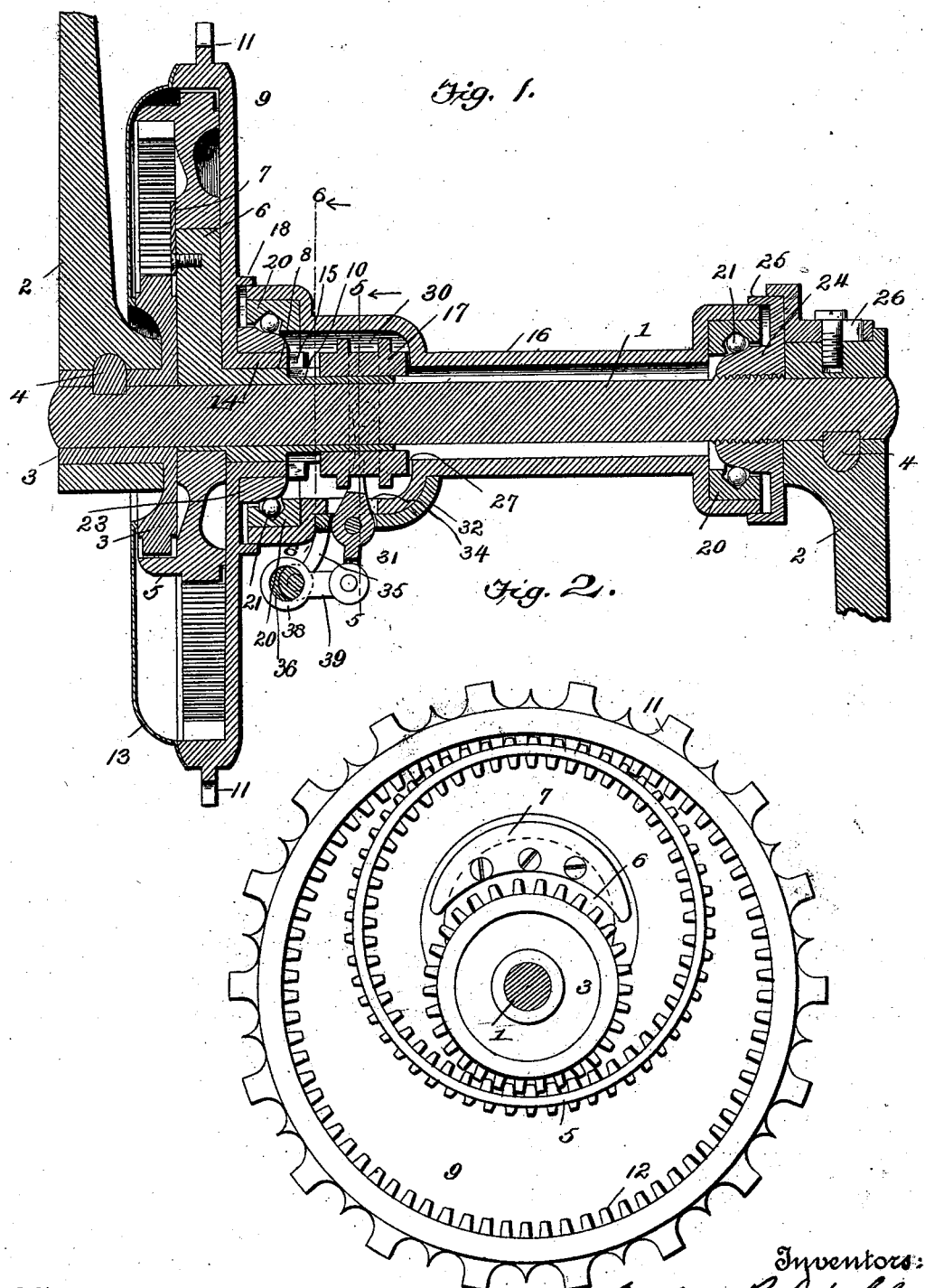

W. R. & E. G. DIEHL.
VELOCIPEDE.

No. 511,290. Patented Dec. 19, 1893.

Witnesses
John Annie
R. W. Bishop

Inventors:
Walter R. Diehl
Edwin G. Diehl
by W. P. Potter
Attorney

THE NATIONAL LITHOGRAPHING COMPANY,
WASHINGTON, D. C.

UNITED STATES PATENT OFFICE.

WALTER R. DIEHL, OF PITTSBURG, AND EDWIN G. DIEHL, OF SHARPSBURG, PENNSYLVANIA.

VELOCIPEDE.

SPECIFICATION forming part of Letters Patent No. 511,290, dated December 19, 1893.

Application filed November 14, 1892. Serial No. 451,848. (No model.)

*To all whom it may concern:*

Be it known that we, WALTER R. DIEHL, residing at Pittsburg, and EDWIN G. DIEHL, residing at Sharpsburg, in the county of Allegheny, State of Pennsylvania, citizens of the United States, have invented certain new and useful Improvements in Velocipedes; and we do hereby declare the following to be a full, clear, and exact description of the invention, such as will enable others skilled in the art to which it appertains to make and use the same.

The object of our invention is to provide certain improvements in the mechanism for propelling bicycles, tricycles and other forms of velocipedes by means of which the rider may convert the machine from a high to a low speed cycle, or vice versa, at will, thus facilitating hill-climbing and travel over heavy roads. With this object in view, the invention consists in certain novel features hereinafter described and claimed.

Figure 3:
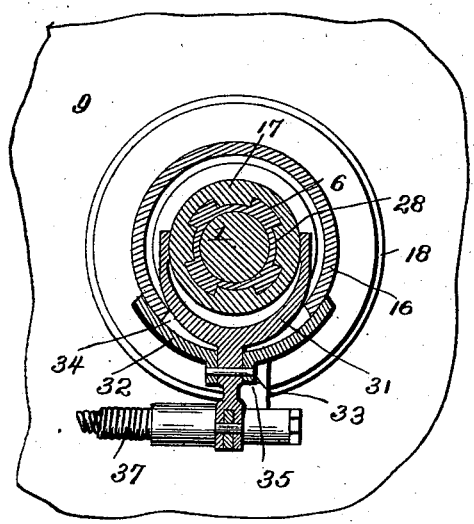
Figure 4:
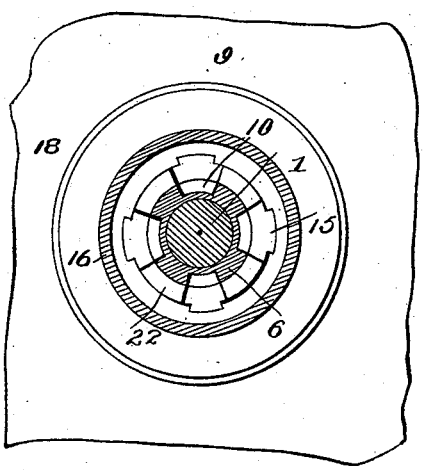
Figure 5:
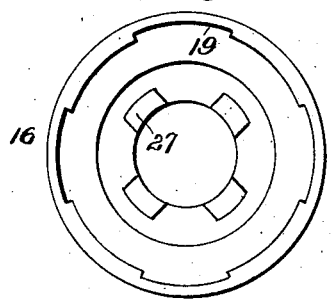
Figure 6:
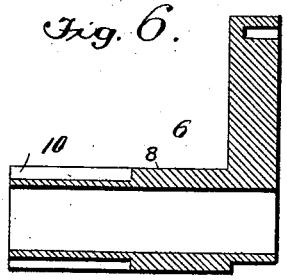
Figure 7:
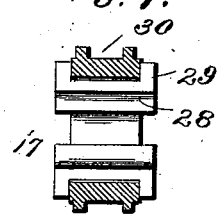
Figure 8:
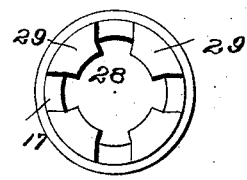
Figure 9:
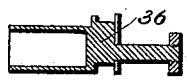
Figure 10:
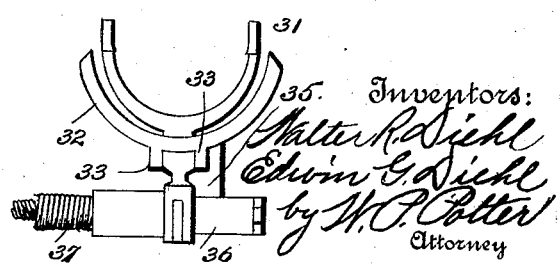

In the annexed drawings, which fully illustrate our invention, Figure 1 is a vertical section of the crank shaft of a cycle provided with our improvements. Fig. 2 is a side elevation of the same, the crank being removed. Fig. 3 is a detail sectional view taken on the line 5—5 of Fig. 1 and looking in the direction of the arrow. Fig. 4 is a similar view taken on the line 6—6 of Fig. 1. Fig. 5 is a detail end view of the outer shell shown in Fig. 1. Fig. 6 is a detail section of the eccentric bearing shown in Fig. 1. Figs. 7 and 8 are detail views of the sliding collar or clutch shown in Fig. 1. Fig. 9 is a detail section of the cam for shifting the gearing. Fig. 10 is a detail elevation of the clutch-shifting lever and its support.

Referring to Fig. 1 of the drawings, 1 designates the crank shaft to which the crank arm 2 and the inner gear wheel 3 are secured by means of keys 4, as clearly shown. The gear wheel 3, it will be noticed, meshes with a double gear-wheel 5, which is mounted loosely on an eccentric bearing 6 which is fitted loosely on the crank-shaft 1, as clearly shown in Fig. 1. The said gear-wheel 5 is prevented from slipping laterally off the said bearing by means of a crescent shaped plate 7 which is secured to the said bearing and projects upward beside the said gear-wheel. The eccentric bearing 6 is provided on its sleeve or arm with the smooth cylindrical surface 8 upon which the sprocket wheel 9 is loosely mounted and beyond said smooth surface 8 it is provided with the longitudinal grooves 10 which extend to its end, as clearly shown in Figs. 1 and 8. The sprocket-wheel 9 is provided with the usual sprocket teeth 11 over which the ordinary sprocket-chain is engaged to transmit motion to the cycle wheel. The sprocket-wheel is further provided with the internal gear-teeth 12 which mesh with the external teeth of the wheel 5, as shown most clearly in Fig. 1, and to the outer face of the sprocket-wheel we secure a dust-cap 13 which extends over the inner gear-wheel so as to prevent dust and dirt accumulating therein. The hub 14 of the sprocket-wheel is provided with notches 15 in its end which register with the grooves 10 of the eccentric bearing and are adapted to be engaged by the sliding clutch or collar hereinafter referred to.

A shell 16 encircles the crank-shaft and has its ends enlarged so as to accommodate the sliding clutch or collar 17 and the anti-friction bearings, as clearly shown in Fig. 1. That end of this shell which is nearest the sprocket-wheel fits snugly within a sand-band or ring 18 which is formed on the outer face of the sprocket-wheel so as to prevent the entrance of dirt and dust to the interior of the shell. The ends of the shell are provided with the recesses 19 in which we secure the race-ways 20 which receive and hold the balls or bearings 21. The hub of the sprocket wheel 9 is constructed with similar recesses 22 which receive and hold the cones 23 over which the bearings move. At the end of the crank-shaft opposite the sprocket-wheel, we mount the adjustable cone 24 which is provided with an annular flange 25 adapted to encircle the end of the shell and thereby prevent the entrance of dirt and dust. This adjustable cone can be turned inward along the crank-shaft so as to compensate for the wear on the bearings and after it has been adjusted it is secured in position by means of the clamp 26 which is secured to the crank-arm, as clearly shown in Fig. 1. The shell is further provided with notches 27 which are adapted to be engaged by the clutch or collar 17 which is mounted upon the sleeve of the eccentric bearing and moves in the grooves 10 of the same. This sliding clutch or collar is provided with the internal transverse lugs 28 which engage the said grooves 10 and it is also provided with the end lugs 29 which are adapted to engage the notches 27 in the shell or the notches 15 of the sprocket-wheel. The clutch is further provided with the external annular groove 30 which is engaged by the ends of a forked lever 31 which is fulcrumed upon a cap 32 secured to the shell. The said cap is provided with a pair of lugs 33 between which the lever is fulcrumed and the lever extends upward therefrom through a slot or opening 34 in the shell to engage the clutch. The cap is further provided with a depending post 35 in which the end of the cam 36 is journaled, the said cam being secured to the end of a flexible shaft 37 and passing through an eye 38 at the end of a strap 39 which is pivoted to the lower end of the lever 31. The flexible rod or shaft 37 is constructed with a core consisting of a number of steel wires of suitable thickness tightly twisted together. A number of similar wires are then twisted over and around this central core in the opposite direction and the end soldered or brazed together, one end of the shaft being then secured in the socket of the cam 36 and the other end provided with an operating lever. This construction of the shaft imparts torsional strength thereto in either direction.

Ordinarily the clutch is thrown out so as to engage the notches 15 in the sprocket-wheel 9 and thereby lock the same to the eccentric bearing 6. When thus arranged, the machine will be driven at a very high speed but will have a correspondingly low power for climbing hills or traveling heavy roads. If it be desired to climb a hill or travel a heavy road without the necessity of an increased exertion on the part of the rider, the flexible shaft is given a partial turn and the cam 36 consequently caused to draw the strap 39 outward thereby vibrating the lever 31 and throwing the clutch inward to engage the notches 27 on the shell. The eccentric bearings will thus be prevented from rotating and the machine will be driven at a lower speed than before but will be found to possess greater power to travel heavy roads or climb hills.

It will be noticed that the several parts are all very compactly arranged so as to occupy but very little room and consequently not interfere with the manipulation of the machine. The several parts are all protected against the entrance and accumulation of dust and dirt and wear on the internal surfaces is consequently reduced to a minimum. The raceways and cones for the balls or bearings are fitted in place in such a manner that they are held very securely and at the same time may be quickly and easily removed when worn out to permit the substitution of new parts. The flexible shaft may be carried to the saddle or the handle bar of the machine or to any other convenient point of the frame where it may be easily and readily operated by the rider.

The frame of the machine is not a part of our invention and may be any of the forms or styles now in common use or any form that may be hereinafter specially produced.

Slight changes may be made in the details of construction or in the form or proportion of the parts without departing from the principles of our invention and we do not, therefore, limit ourselves to the exact device illustrated.

Having thus described our invention, what we claim, and desire to secure by Letters Patent, is—

1. The combination with the driving shaft, of an eccentric mounted thereon, a pinion secured on the driving shaft, a sprocket wheel mounted on the sleeve of the eccentric, a double-gear wheel mounted on the eccentric and engaging the pinion and the sprocket wheel, and means for locking the sprocket wheel to the eccentric.

2. The combination with the driving shaft and the shell encircling the same, of an eccentric mounted loosely on the driving shaft, a pinion secured on said shaft, a double gear wheel mounted on the eccentric and meshing with the pinion, a sprocket wheel mounted on the sleeve of the eccentric and provided with internal gear teeth meshing with the double gear wheel, and a clutch mounted on the sleeve of the eccentric and adapted to engage the shell or the sprocket wheel.

3. The combination of the driving shaft, the pinion secured thereon, the eccentric loosely mounted on the shaft and having its sleeve provided with longitudinal grooves, the shell surrounding the driving shaft, the double gear wheel mounted on the eccentric and meshing with the pinion, the sprocket wheel mounted loosely on the sleeve of the eccentric and provided with internal teeth meshing with the double gear wheel, and a sliding clutch mounted in the grooves of the eccentric and adapted to engage the shell or the sprocket wheel.

4. The combination with the shell, the driving shaft, and the eccentric gearing arranged substantially as described, of a clutch mounted on the shaft and adapted to engage the shell or the eccentric gearing, a cap secured on the shell and having a depending post, a lever pivoted to the cap and engaging the clutch, a cam journaled in the depending post, a link connecting the cam with the lever, and a flexible shaft secured to the cam and adapted to rotate the same.

In testimony whereof we affix our signatures in presence of two witnesses.

WALTER R. DIEHL.
EDWIN G. DIEHL.

Witnesses:
F. K. McCANER,
WM. A. STONE.